US011551665B2

(12) United States Patent
Kennewick

(10) Patent No.: US 11,551,665 B2
(45) Date of Patent: Jan. 10, 2023

(54) DYNAMIC CONTEXTUAL DIALOG SESSION EXTENSION

(71) Applicant: Oracle International Corporation, Redwood Shores, CA (US)

(72) Inventor: Michael Richard Kennewick, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 131 days.

(21) Appl. No.: 16/923,483

(22) Filed: Jul. 8, 2020

(65) Prior Publication Data
US 2021/0082397 A1 Mar. 18, 2021

Related U.S. Application Data

(60) Provisional application No. 62/899,645, filed on Sep. 12, 2019.

(51) Int. Cl.
*G10L 15/05* (2013.01)
*G06F 3/16* (2006.01)
*G06F 40/205* (2020.01)
*G10L 15/26* (2006.01)

(52) U.S. Cl.
CPC .............. *G10L 15/05* (2013.01); *G06F 3/167* (2013.01); *G06F 40/205* (2020.01); *G10L 15/26* (2013.01)

(58) Field of Classification Search
CPC ......... G10L 15/22; G10L 15/26; G10L 15/05; G10L 15/04; G10L 15/30; G06F 3/167; G06F 40/205; G06F 40/20
See application file for complete search history.

(56) References Cited

U.S. PATENT DOCUMENTS

| | | | | |
|---|---|---|---|---|
| 2001/0049688 | A1* | 12/2001 | Fratkina | G06F 16/954 |
| 2002/0184031 | A1* | 12/2002 | Brittan | G10L 15/22 |
| | | | | 704/E15.04 |
| 2005/0216264 | A1* | 9/2005 | Attwater | G10L 15/22 |
| | | | | 704/E15.04 |
| 2013/0241952 | A1* | 9/2013 | Richman | G06Q 30/00 |
| | | | | 345/619 |
| 2015/0340033 | A1* | 11/2015 | Di Fabbrizio | G06F 16/3329 |
| | | | | 704/254 |
| 2018/0012591 | A1* | 1/2018 | Aleksic | G10L 15/22 |
| 2018/0075847 | A1* | 3/2018 | Lee | G06F 16/24522 |
| 2019/0385051 | A1* | 12/2019 | Wabgaonkar | G06N 3/006 |

OTHER PUBLICATIONS

International Application No. PCT/US2020/041460, International Search Report and Written Opinion dated Oct. 14, 2020, 11 pages.
Lugosh et al., *Speech Model Pre-training for End-to-End Spoken Language Understanding*, Jul. 25, 2019, pp. 5. (https://arxiv.org/pdf/1904.03670.pdf).
Haghani et al., *From Audio to Semantics: Approaches to End-to-End Spoken Language Understanding*, Sep. 24, 2018, pp. 7 (https://arxiv.org/abs/1809.09190).

* cited by examiner

*Primary Examiner* — Vijay B Chawan
(74) *Attorney, Agent, or Firm* — Kilpatrick Townsend & Stockton LLP

(57) ABSTRACT

A dialog system is described that is capable of maintaining a single dialog session covering multiple user utterances, which may be separated by pauses or time gaps, and that continuously determines intent across the multiple utterances within a session.

15 Claims, 8 Drawing Sheets

DYNAMIC CONTEXTUAL DIALOG SESSION EXTENSION

CROSS-REFERENCE TO RELATED APPLICATIONS

The present application claims the benefit and priority under 35 U.S.C. 119(e) of U.S. Application No. 62/899,645, filed on Sep. 12, 2019, entitled "Continuous Intent Determination Across Utterances," the entire contents of which is incorporated herein by reference for all purposes.

TECHNICAL FIELD

The present disclosure relates generally to dialog systems. More specifically, but not by way of limitation, this disclosure describes techniques for improving the experience and efficiency of a dialog session by dynamically extending the dialog session based on contextual factors.

BACKGROUND

An increasing number of devices now enable users to interact with the devices directly using voice or spoken speech. For example, a user can speak to such a device in a natural language where the user may ask a question or make a statement requesting some action to be performed. In response, the device performs the requested action or responds to the user's question using voice output. Since interacting directly using voice is a more natural and intuitive way for humans to communicate with their surroundings, the popularity of such speech-based systems is growing at an astronomical rate.

In conventional systems, the interaction between a user and a device that implements such as dialog system is based upon a single-input-single-response paradigm. For example, a user initiates or wakes up the dialog system by saying a wake word or pressing a "begin-dialog" button. The wake word or button press causes the dialog system to initiate a new dialog session. The user's spoken speech utterance immediately after the wake word or button press is received. A pause for a period of time or a time gap of silence marks the end of the speech input. The speech input is processed by the dialog system and a response generated and output the user. The dialog session is terminated after the response is output to the user. Once the dialog session is terminated, if the user wants to start a new dialog, the user has to speak the wake-word or press the begin-dialog button. This single-input-single-response paradigm creates an unnatural flow to the dialog and can be frustrating to the user.

BRIEF SUMMARY

The present disclosure relates generally to dialog systems. More particularly, a dialog system is described that is capable of maintaining a single dialog session covering multiple user utterances, which may be separated by pauses or time gaps. The dialog system may provide the user with continuous feedback (e.g., of Natural Language Understanding (NLU)/Semantic Parser output) while the user is speaking one or more sentences. The dialog system may determine conditions under which to ignore pauses or breaks in speech input. The dialog system may continuously generate NLU output from continuous speech as it is processed by an Automatic Speech Recognition (ASR) subsystem. Various embodiments are described herein, including methods, systems, non-transitory computer-readable storage memories storing programs, code, or instructions executable by one or more processors, and the like.

In certain embodiments, a dialog system initiates a dialog session. The dialog system receives a first speech input. The dialog system detects a pause in the first speech input indicative of completion of a first spoken utterance. The dialog system determines, based on the first spoken utterance, a stopping condition for the dialog session, wherein the stopping condition indicates a first time value by which the dialog session is to be extended. The dialog system determines that the stopping condition for the dialog session is not met. Responsive to determining that the stopping condition is not met, the dialog system extends the dialog session by at least the first time value indicated by the stopping condition.

In some aspects, the dialog system further determines that the dialog session is in a particular state, of a plurality of configured states, wherein the dialog system determines the stopping condition for the dialog session based on the determined state. In some aspects, the dialog system further generates a response based on the first speech input and outputs the response. In some aspects, generating and outputting the response is performed prior to determining that the stopping condition is not met.

In some aspects, the dialog system further receives a second speech input, detects a second pause in the second speech input indicative of completion of a second spoken utterance, and determines, based on the second spoken utterance, a second stopping condition for the dialog session, wherein the second stopping condition indicates a second time value by which the dialog session is to be extended. In some aspects, the dialog system further identifies an intent based on the first speech input and the second speech input.

In some aspects, the dialog system further generates a response based on one or more of the first speech input or the second speech input and outputs the response. In some aspects, subsequent to outputting the response, the dialog system further determines that the stopping condition is met and terminates the dialog session. In some aspects, the dialog system determines the second stopping condition based upon one or more of: a length of the pause, the first speech input, or the second speech input.

In some aspects, initiating the dialog session comprises one or more of detecting a wake word or detecting interaction with a start button. In some aspects, the dialog system further receives a third speech input. Based upon the third speech input and the first speech input, the dialog system determines that the third speech input is not relevant to the first speech input, and disregards the third speech input.

Embodiments further include systems and computer-readable media configured for performing the methods described herein.

The foregoing, together with other features and embodiments will become more apparent upon referring to the following specification, claims, and accompanying drawings.

DETAILED DESCRIPTION

Figure 1:
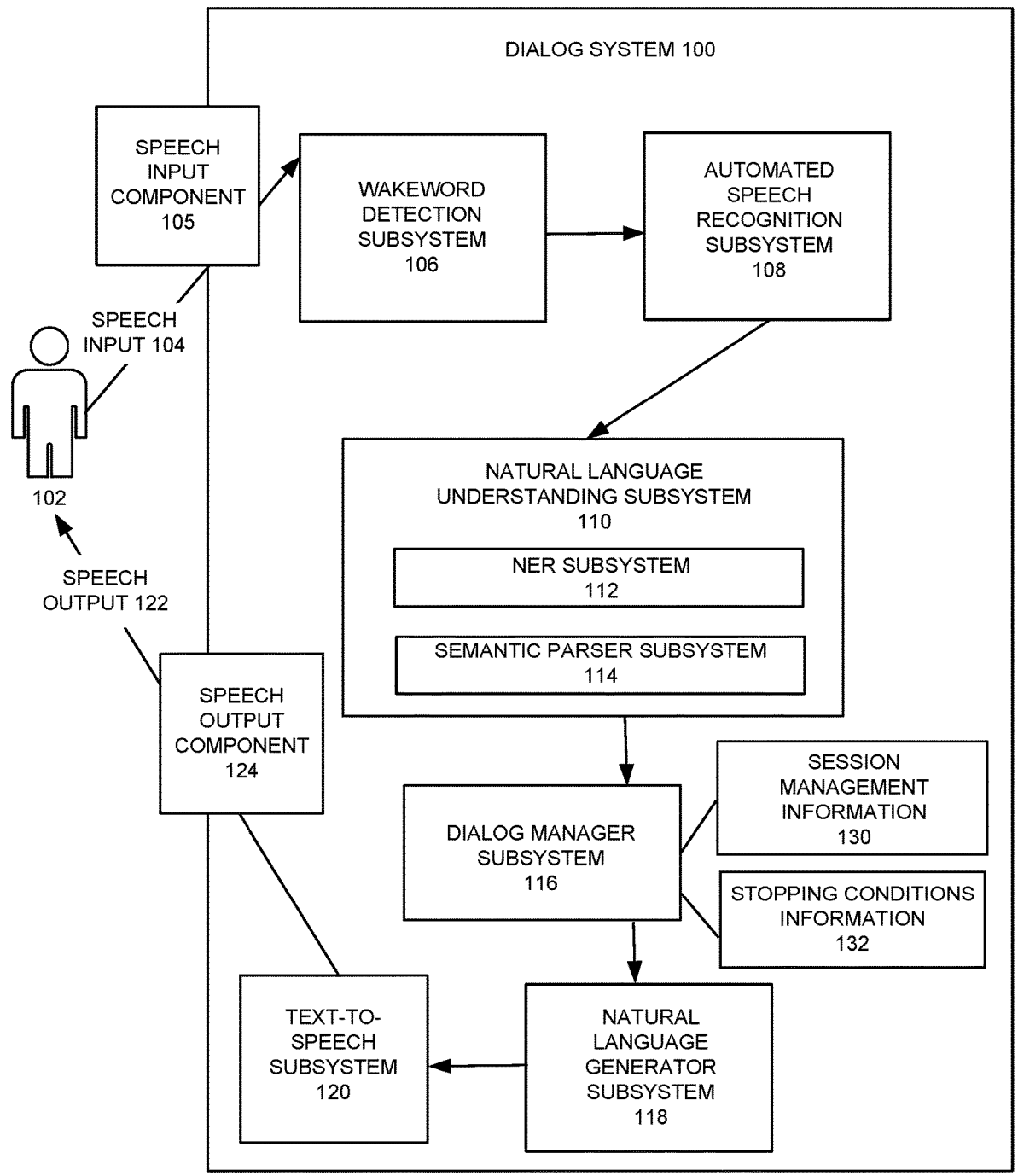
FIG. 1 is a simplified block diagram depicting a dialog system according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as exemplary is not necessarily to be construed as preferred or advantageous over other embodiments or designs.

A voice-enabled system that is capable of having a dialog with a user via voice inputs and voice outputs can come in various forms. For example, such a system may be provided as a stand-alone device, as a digital or virtual assistant, as a voice-capable service, and the like. In each of these forms, the system is capable of receiving voice or speech inputs, understanding the inputs, generating responses or taking actions responsive to the inputs, and outputting the responses using voice outputs. In certain embodiments, the dialog functionality in such a voice-enabled system is provided by a dialog system or infrastructure ("dialog system").

As noted above, it is common for dialog sessions to terminate after each utterance is received and processed. For example, prior dialog systems generally terminate a session after detecting a pause, and a user must restart a new dialog session (e.g., by speaking a wake word) to proceed with providing additional input. This single-input-single-response paradigm creates an unnatural flow to the dialog and can be frustrating to the user.

An "utterance" is a unit or span of speech marked by boundary elements, where a boundary element can be a pause, a time gap of no speech input, or a wake-word. An utterance may include one word or a group of words. The group of words can include one or multiple phrases, one or multiple sentences, one or more multiple questions, and combinations thereof. For example, if a user speaks multiple sentences without taking a break or pause, the multiple sentences may represent one utterance. "Speech input" received by the dialog system may include one utterance, multiple utterances, or a partial utterance.

Generally, in conventional dialog systems, interactions with the user are short-lived—e.g., an utterance made of a single sentence is accepted, the utterance is processed and a response generated, and the response output is then output to the user possibly as speech output. As discussed above, this single-input-single response paradigm does not approximate a natural speech interaction and thus offers a frustrating user experience for the user. For example, when a person is ordering pizza or buying groceries, the natural speech interaction involves multiple utterances interspersed with pauses, back-and-forth interactions, periods of unrelated speech (e.g., "ummm . . . " or "Honey, what do you want?"), and the like. However, for placing the same order using a conventional dialog system, the user has to keep saying the wake-word (or press the begin-dialog button) to initiate a new conversation or dialog session for each individual utterance. The techniques described herein describe a dialog system that can maintain a longer single dialog session with a user, where the single session can include multiple user utterances separated by pauses or time gaps, and where intent determination is performed across the multiple utterances. This creates a more friendly experience from the user, as well as creates a more efficient process in terms of computing time and resources required. For example, conventional systems commonly interrupt a user if there is a relatively long pause between words, even if the user is not done speaking. Conventional system will often attempt to provide a response based on the partial input and end the session. Such responses to a pause can result in the user having to start over and provide the input again, which can multiply the time and computing resources used to resolve the user's query, as well as frustrate the user.

In certain embodiments, a dialog system maintains a continuous dialog with a user across multiple utterances. The dialog system may provide the user with continuous feedback (e.g., of Natural Language Understanding (NLU)/Semantic Parser output) while the user is speaking one or more sentences. The dialog system may determine conditions under which to ignore pauses or breaks in speech input. The dialog system may continuously generate NLU output from continuous speech as it is processed by an Automatic Speech Recognition (ASR) subsystem. The dialog system may continuously listen to a user (e.g., remain in a listening state) for a session that might last several minutes or tens of minutes. For example, the dialog system may continuously listen for the duration of an ordering process while the user is trying to figure out their order.

For example, ordering a pizza naturally unfolds through multiple utterances. Prior systems typically required one request and one response from the system within a dialog session. However, if the experience was more streamlined, there could be pauses or breaks in a request, more closely approximating a natural speech interaction. For example, using the techniques described herein, the following can be accomplished in a single session with continuous speech recognition and continuous NLU processing:

"What specials do you have?"
[system shows results]
"I'll take the Greek special." . . . [pause]. " . . . add olives" . . . . " . . . no peppers"
"I'd also like a large cheese pizza." . . . "Make it a thin crust" . . . "Actually I'll take two".
[pause]
"Add a 2 liter cola as well and that's it."
[system recaps order]

FIG. 1 illustrates an example of a dialog system 100, according to some embodiments. The dialog system 100 is configured to receive voice or speech inputs 104 (also referred to as speech utterances) from a user 102. The dialog system 100 may then interpret the voice inputs. The dialog system 100 may maintain a dialog with the user 102, and possibly perform or cause one or more actions to be performed based upon interpretations of the voice inputs. The dialog system 100 may prepare appropriate responses, and output the responses to the user using voice or speech output. The dialog system 100 is a specialized computing system that may be used for processing large amounts of data using a large number of computer processing cycles. The numbers of devices depicted in FIG. 1 are provided for illustrative purposes. Different numbers of devices may be used. For example, while each device, server, and system in FIG. 1 is shown as a single device, multiple devices may instead be used.

In certain embodiments, the processing performed by a dialog system is implemented by a pipeline of components or subsystems, including a speech input component 105, a wake-word detection (WD) subsystem 106, an automatic speech recognition (ASR) subsystem 108, a natural language understanding (NLU) subsystem 110, which includes a named entity recognizer (NER) subsystem 112 and a semantic parser subsystem 114, a dialog manager (DM) subsystem 116, a natural language generator (NLG) subsystem 118, a text-to-speech (TTS) subsystem 120, and a speech output component 124. The subsystems listed above may be implemented only in software (e.g., using code, program, or instructions executable by one or more processors or cores), in hardware, or in a combination of hardware and software. In certain implementations, one or more of the subsystems may be combined into a single subsystem. Additionally or alternatively, in some implementations, the functions described herein as performed by a particular subsystem may be implemented by multiple subsystems.

The speech input component 105 includes hardware and software configured to receive speech input 104. In some instances, the speech input component 105 may be part of the dialog system 100. In some other instances, the speech input component 105 may be separate from and be communicatively coupled to the dialog system 100. The speech input component 105 may, for example, include a microphone coupled to software configured to digitize and transmit speech input to the wake-word detection subsystem 106.

The wake-word detection (WD) subsystem 106 is configured to listen for and monitor a stream of audio input for input corresponding to a special sound or word or set of words (referred to as a wake-word). Upon detecting the wake-word configured for the dialog system 100, the WD subsystem 106 is configured to activate the ASR subsystem 108. In certain implementations, a user may be provided the ability to activate or deactivate the WD subsystem 106 (e.g., by speaking the wake-word pushing a button). When activated (or operating in active mode), the WD subsystem 106 is configured to continuously receive an audio input stream, and process the audio input stream to identify audio or voice input corresponding to the wake-word. When audio input corresponding to the wake-word is detected, the WD subsystem 106 activates the ASR subsystem 108.

As described above, the WD subsystem 106 activates the ASR subsystem 108. In some implementations of the voice-enabled system, mechanisms other than wake-words may be used to trigger or activate the ASR subsystem 108. For example, in some implementations, a push button on a device may be used to trigger the ASR subsystem 108 processing without needing a wake-word. In such implementations, the WD subsystem 106 may not be provided. When the push button is pressed or activated, the speech input received after the button activation is provided to the ASR subsystem 108 for processing. In some implementations, the ASR subsystem 108 may be activated upon receiving an input to be processed.

The ASR subsystem 108 is configured to receive and monitor spoken voice input after a trigger or wake-up signal (e.g., the wake-up signal may be sent by the WD subsystem 106 upon the detection of a wake-word in the speech input, the wake-up signal may be received upon the activation of a button, etc.) and to convert the voice input to text. As part of its processing, the ASR subsystem 108 performs speech-to-text conversion. The spoken speech or voice input may be in a natural language form, and the ASR subsystem 108 is configured to generate the corresponding natural language text in the language of the speech input. The text generated by the ASR subsystem is then fed to the NLU subsystem 110 for further processing. The voice input received by the ASR subsystem 108 may include one or more words, phrases, clauses, sentences, questions, etc. The ASR subsystem 108 is configured to generate a text utterance for each spoken clause and feed the text utterances to the NLU subsystem 110 for further processing.

The NLU subsystem 110 receives texts generated by the ASR subsystem 108. The texts received by the NLU subsystem 110 from the ASR subsystem 108 may include text utterances corresponding to spoken words, phrases, clauses, etc. The NLU subsystem 110 translates each text utterance (or a series of text utterances) to its corresponding logical form.

In certain implementations, the NLU subsystem 110 includes a named entity recognizer (NER) subsystem 112 and a semantic parser (SP) subsystem 114. The NER subsystem 112 receives a text utterance as input, identifies named entities in the text utterance, and tags the text utterance with information related to the identified named entities. The tagged text utterances are then fed to the SP subsystem 114, which is configured to generate a logical form for each tagged text utterance (or for a series of tagged text utterances). The logical form generated for an utterance may identify one or more intents corresponding to the text utterance. An intent for an utterance identifies an objective of the utterance. Examples of intents include "order pizza" and "find directions." An intent may, for example, identify an action that is requested to be performed. In addition to intents, a logical form generated for a text utterance may also identify slots (also referred to as parameters or arguments) for the identified intent. For example, for the speech input "I'd like to order a large pepperoni pizza with mushrooms and olives," the NLU subsystem 110 can identify the intent order pizza. The NLU subsystem can also identify and fill slots, e.g., pizza_size (filled with large) and pizza_toppings (filled with mushrooms and olives). The NLU subsystem may use machine learning based techniques, rules (which may be domain specific), or a combination of the two, to generate the logical forms. The logical forms generated by the NLU subsystem 110 are then fed to the DM subsystem 116 for further processing.

The DM subsystem 116 is configured to manage a dialog with the user based upon logical forms received from the NLU subsystem 110. As part of the dialog management, the DM subsystem 116 is configured to track dialog states, initiate the execution of or itself execute one or more actions or tasks, and determine how to interact with the user. These actions may include, for example, querying one or more databases, producing execution results, and other actions. For example, the DM subsystem 116 is configured to interpret the intents identified in the logical forms received from the NLU subsystem 110. Based upon the interpretations, the DM subsystem 116 may initiate one or more actions that it interprets as being requested by the voice inputs provided by the user. In certain embodiments, the DM subsystem 116 performs dialog states tracking based upon current and past voice inputs and based upon a set of rules (e.g., dialog policies) configured for the DM subsystem 116. These rules may specify the different dialog states, conditions for transitions between states, actions to be performed when in a particular state, and the like. These rules may be domain specific. The DM subsystem 116 also generates responses to be communicated back to the user involved in the dialog. These responses may be based upon actions initiated by the DM subsystem 116 and their results. The responses generated by the DM subsystem 116 are fed to the NLG subsystem 118 for further processing.

As further described below with respect to FIG. 2, the DM subsystem 116 includes subsystems configured to track the dialog states and determine stopping conditions and responses based on such dialog state information. In some embodiments, the DM subsystem 116 maintains state information which can be used to determine whether, and how long, to extend a dialog session despite pauses or breaks in a dialog. The DM subsystem 116 may use configured session management information 130 to track these states. For example, as described in further detail below with respect to FIGS. 2-4, such states may include "Likely_To_Continue"—the user is likely to continue to provide additional voice input, and "Likely_No_Additional_Input"—it is likely that additional speech input will not be received. The dialog system may assign a particular state to the dialog session at a given time based upon factors such as the content of one or more utterances in the dialog session, the length of pauses, multi-modal input (e.g., buttons pushed), and so forth. The current state of the dialog session may correspond to whether, and how long, to continue the dialog session. For example, for state 1, the dialog session should continue for at least 1 minute, while for state 2, a stopping condition has been met, and the dialog session should be terminated. Stopping conditions information 132 may include rules for whether to stop or extend a dialog session, and how long to extend a dialog session. As described herein, a stopping condition may correspond to a time period value for extending the dialog session.

The NLG subsystem 118 is configured to generate natural language texts corresponding to the responses generated by the DM subsystem 116. The texts may be generated in a form that enables them to be converted to speech by the TTS subsystem 120. The TTS subsystem 120 receives the texts from the NLG subsystem 118 and converts each of them to speech or voice audio, which may then be output to the user via an audio or speech output component 124 of the dialog system (e.g., a speaker, or communication channel coupled to an external speaker). In some instances, the speech output component 124 may be part of the dialog system 100. In some other instances, the speech output component 124 may be separate from and communicatively coupled to the dialog system 100.

As described above, the various subsystems of the dialog system 100 working in cooperation provide the functionality that enables the dialog system 100 to receive speech inputs 104 and respond using speech outputs 122 and maintain a dialog with a user using natural language speech. The various subsystems described above may be implemented using a single computer system or using multiple computer systems working cooperatively. For example, for a device implementing the voice-enabled system, the subsystems of the dialog system 100 described above may be implemented entirely on the device with which the user interacts. In some other implementations, some components or subsystems of the dialog system 100 may be implemented on the device with which the user interacts, while other components may be implemented remotely from the device, possibly on some other computing devices, platforms, or servers.

As described above, in certain embodiments, a dialog system 100 may be implemented using a pipeline of subsystems. In some embodiments, one or more of the subsystems may be combined into a single subsystem. In certain embodiments, the functionality provided by a particular subsystem may be provided by multiple subsystems. A particular subsystem may also be implemented using multiple subsystems.

In certain embodiments, machine learning techniques may be used to implement one or more functions of the dialog system 100. For example, supervised machine learning techniques such as those implemented using a neural network (e.g., a deep neural network) may be used to implement one or more functions of the dialog system 100. As one example, a neural network may be provided that is trained to perform ASR functions performed and such a trained model may be used by the ASR subsystem 108 for its processing. Such a neural network implementation may take the speech input as input and output a text utterance to the NLU subsystem. Machine learning based models may also be used by other subsystems of the dialog system 100.

Figure 2:
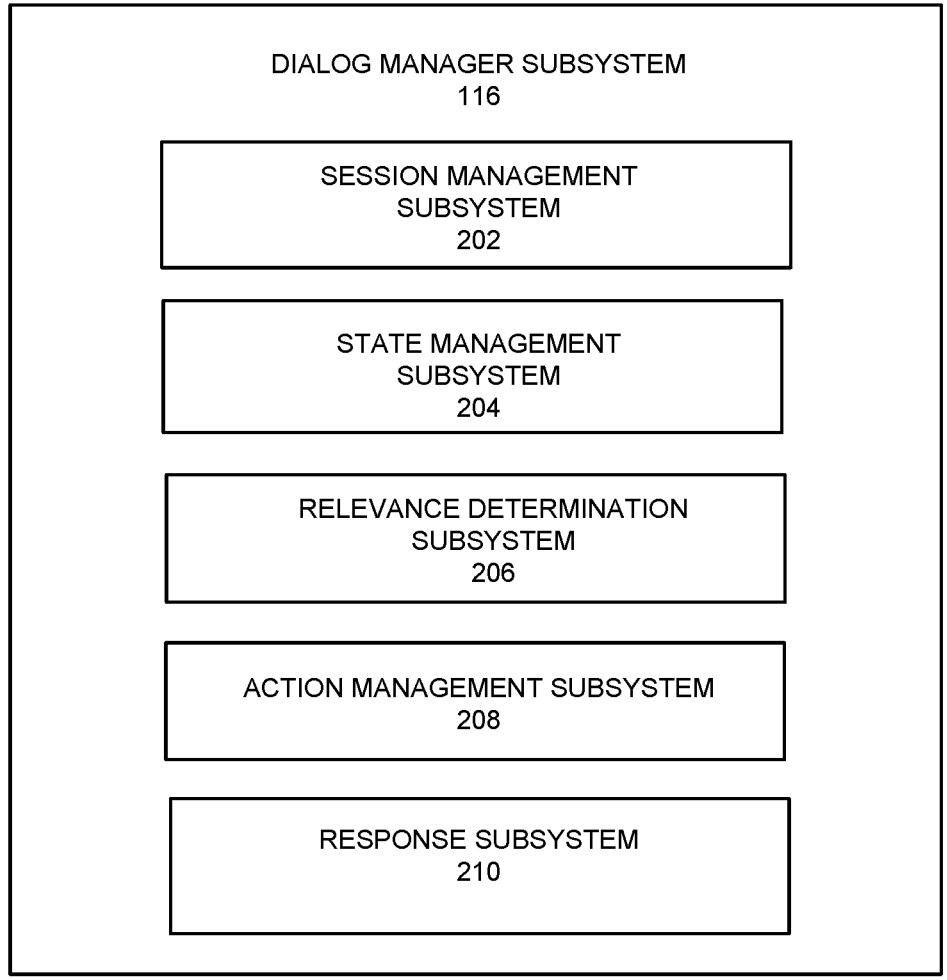
FIG. 2 is a simplified block diagram depicting the dialog manager subsystem of FIG. 1 according to certain embodiments.

FIG. 2 is a simplified block diagram depicting the dialog manager subsystem 116 of FIG. 1 in further detail, according to certain embodiments. As described above, the dialog manager subsystem 116 is configured to manage a dialog with a user based upon logical forms received from the NLU subsystem 110. The dialog manager subsystem 200 includes a session management subsystem 202, a state management subsystem 204, a relevance determination subsystem 206, an action management subsystem 208, and a response subsystem 210.

The state management subsystem 204 can track dialog states. In certain embodiments, the state management subsystem 204 performs dialog states tracking based upon current and past speech input. The state management subsystem may determine whether the dialog is in one of several configured states. In certain embodiments, the dialog states may be defined as a state transition diagram comprising multiple states and transitions between the states. A set of rules (e.g., dialog policies) may specify the different dialog states, as well as conditions for transitions between states, actions to be performed when in a particular state, and the like. For example, based upon one or more voice inputs, and corresponding intents and logical forms determined by the NLU subsystem, the state management system may determine whether the dialog is in one of several preconfigured states. In some embodiments, the following states may be defined:

(1) "Likely_To_Continue"—is established when, based upon received speech input, the dialog system determines that the user is likely to continue to provide additional speech input. For example, if an utterance is processed which is missing required information, the dialog system may determine that the dialog is in the Likely_To_Continue state (e.g., "I'd like a . . . [pause]").

(2) "Unclear_About_Additional_Input"—is established, when, based upon received speech input, the dialog system determines that it is unclear whether additional input will be provided by the user (e.g., clarification should be provided). For example, after receiving a first utterance "I'd like a . . . [pause]," and a second utterance "pepperoni pizza . . . [pause]," additional input may be possible, but not necessary. In this case, the dialog system may determine that the dialog is in the Unclear_About_Additional_Input state, and output a response asking the user "Anything else?".

(3) "Likely_No_Additional_Input"—is established when, based upon received speech input, the system determines that it is likely that additional speech input will not be received. As an example, continuing the above example for ordering a pizza, if the user then says, "No, that's it," than it is likely that additional speech input will not be received, in which case the dialog system may determine that the dialog system is in the Likely_No_Additional_Input state.

The session management subsystem 202 determines when to stop or start a session. The determination to stop a session may be based upon a current state determined by the state management subsystem 204. Other factors that may be used to manage a session include the length of the overall session and pauses between different units of speech input. Different rules for session lengths may be managed for different contexts. For instance, the session management subsystem 202 may maintain longer sessions for dialogs related to personal shopping, and relatively short sessions for dialogs related to the weather.

The relevance determination subsystem 206 determines whether particular utterances are relevant to an overall dialog within a dialog session. For example, the relevance determination subsystem may include one or more machine-learning models trained to detect words indicative of input that should be disregarded (e.g., "ummm," "hey," etc.). Alternatively, or additionally, the relevance determination subsystem 206 may be trained to identify unrelated utterances based upon expected input related to an intent. For example, if the user has been providing speech input related to a restaurant order, focused on food and drink items, then the relevance determination subsystem may determine that utterances that do not include food or drink related words should potentially be discarded.

The action management subsystem 208 determines actions or tasks to perform based upon information received from the NLU subsystem 110. The action management subsystem 208 may initiate, or itself execute, one or more actions that it interprets as being requested by the voice inputs provided by the user. Examples of such actions include querying one or more databases, performing Internet searches, and initiating purchases.

The response subsystem 210 generates responses to be provided to the user. These responses may be based upon intents and logical forms received from the NLU subsystem, as well as actions initiated by the ASR subsystem 108 and their results. The responses generated by the response subsystem 210 are fed to the NLG subsystem 118 and TTS subsystem 220 for further processing. For example, the response subsystem 210 may generate a text response in computer-readable form, which the NLG subsystem 118 converts to natural language text, and the TTS subsystem 220 converts to a spoken response. For example, responses that the dialog system may output include "Anything else?", "That will be $39.78, "The capitol of California is Sacramento," and so forth.

Figure 3:
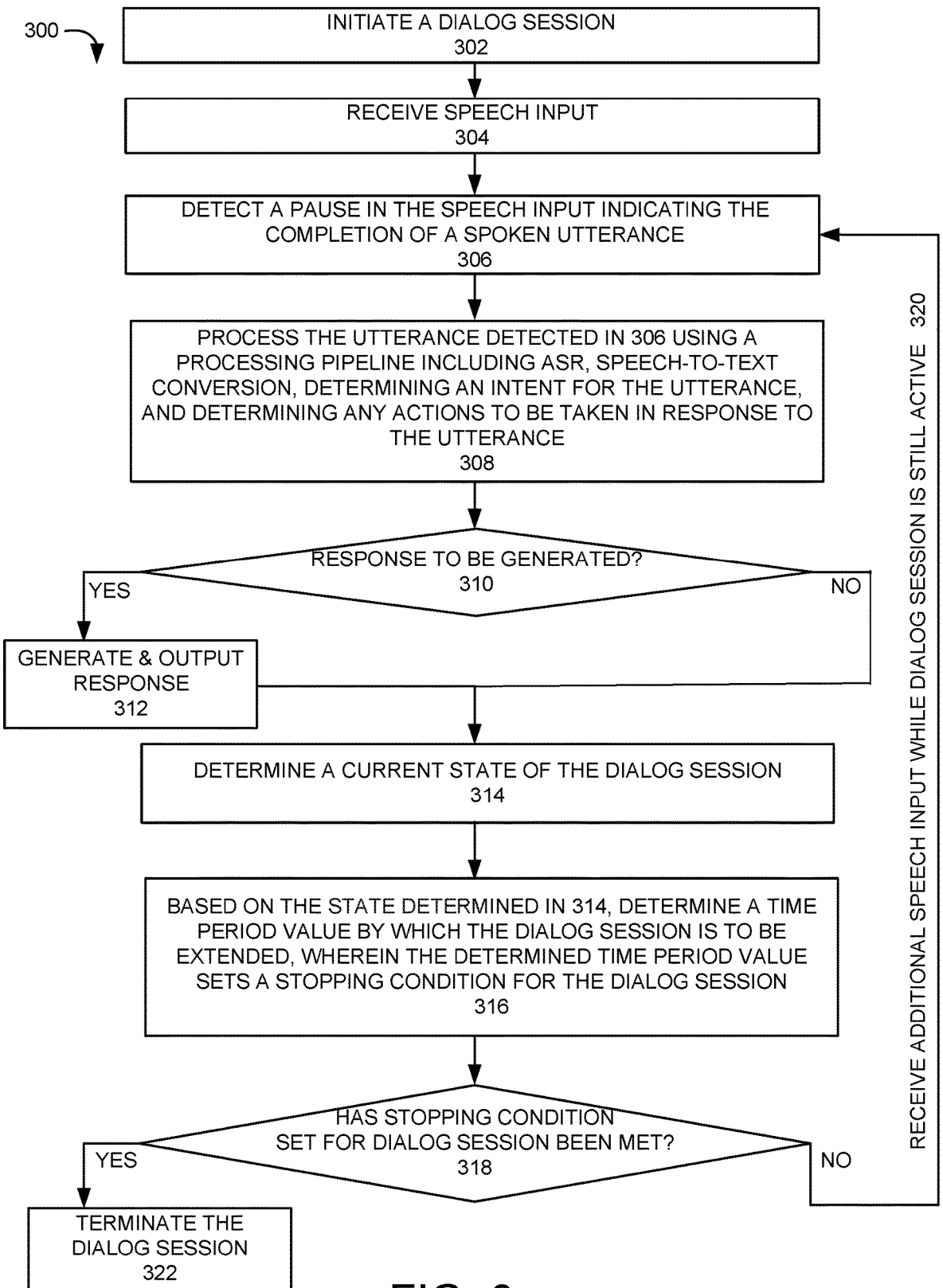
FIG. 3 depicts a simplified flowchart illustrating a method for dialog session extension across one or more utterances according to certain embodiments.

FIG. 3 depicts a simplified flowchart illustrating a method 300 for extending a dialog session across one or more utterances according to certain embodiments. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 3 may be performed by dialog manager subsystem 116 of FIGS. 1 and 2 and other components of the dialog system 100 described above with respect to FIG. 1.

At 302, the dialog system (e.g., session management subsystem 202 of dialog manager subsystem 116) initiates a dialog session. A "dialog session" corresponds to a period of time during which one or more utterances provided by a user as input to the dialog system and one or more responses generated by the dialog system are treated together for purposes of processing performed by the dialog system.

Various different signals or stimuli may cause the dialog system to initiate a dialog session in 302. The dialog system may, for example, initiate a new dialog session responsive to the WD subsystem 106 detecting a wake-word. As another example, the dialog system may initiate a new dialog session responsive to a user causing a signal to be sent to the dialog system indicative that a new dialog session is to be initiated. For example, the dialog system may detect that the has selected or pressed a "dialog start" button or other user-selectable option. Accordingly, initiating the dialog session may include one or more of detecting a wake word or detecting interaction with a start button. Initiating the dialog session may further include generating parameters for the dialog session such as a session identifier and an initial state. Alternatively, or additionally, initiating the dialog session may include allocating memory for the dialog session.

At 304, the dialog system receives a first speech input. The dialog system may receive the first speech input, for example, from a user via the speech input component 105. The speech input may be received as a wave form. The speech input may in a particular language and be in a natural language query form. The speech input may specify a question that the user wants the dialog system to answer, specify one or more actions that the user wants the dialog system to initiate (e.g., "I would like a medium pepperoni pizza."), and the like.

In certain embodiments, instead of receiving a speech input (as in 304 or 322), input may be received in text form, for example, when a user types in text during a chat with a dialog system. The session management techniques described in this disclosure can be used with systems that receive input in the form of spoken speech, or text input, or combinations thereof.

At 306, the dialog system detects a pause in the speech input indicating the completion of a spoken utterance. The dialog system may detect a pause by determining that input has not been provided for a given time. Upon detecting a pause, the dialog system may maintain the session, and remain in a listening state, for the duration of the pause. The dialog system may process the first speech input while maintaining the session during the pause. The dialog system may identify a length of each pause.

At 308, the dialog system processes the spoken utterance identified at 306. The dialog system processes the spoken utterance using a processing pipeline including ASR, speech-to-text conversion, and natural language processing (e.g., determining a logical form and/or intent for the utterance), and determining any actions to be taken in response to the utterance. The dialog system may perform such functions using a pipeline as described above with respect to FIG. 1.

In certain embodiments, the speech input waveform is provided as input to the ASR subsystem 108, which processes the speech input and generate a corresponding text utterance. The ASR subsystem 108 may use different techniques including machine learning-based techniques and rules-based techniques to perform the speech-to-text conversion of the input speech. The text generated by the ASR subsystem 108 is then provided as input to NLU subsystem 110, which determines a logical form and/or intent for the text utterance.

In some embodiments, the dialog system streams text, that may be output of the ASR subsystem 108 or text that is typed by the user, into the NLU subsystem 110. The ASR subsystem may process all incoming speech as the speech input is received and send the text stream to the NLU subsystem in chunks as the text is outputted from the speech recognition process. For example, the ASR subsystem may process a partial utterance as the user continues to speak, and the NLU subsystem may process the partial utterance as the rest of the utterance is processed by the ASR subsystem.

The NLU subsystem may process a text utterance passed from the ASR subsystem by determining a logical form and/or intent corresponding to the text utterance. The NLU subsystem may use different techniques for determining the logical form including but not limited to machine learning techniques (e.g., using a trained model, such as a deep neural network), rules-based techniques, or combinations thereof. For example, a set of rules may assign a Book_Travel intent to a text utterance if the speech input and the corresponding text utterance include the words "book" or "purchase" along with "flight" or "car" or "train," based upon a set of rules. As another example, based upon the utterance "I'd like a large pepperoni," the dialog system may determine the corresponding intent to be Order_Pizza. The dialog system may further generate a logical form corresponding to the first speech input, and may fill slots based upon words identified in the utterance (e.g., the dialog system may assign pepperoni to a toppings slot).

The dialog system may process multiple utterances within a speech session. For example, the dialog system may receive a fist utterance and identify a logical form for the first utterance. The dialog system may then receive a second utterance and identify a logical form for the second utterance. The logical form for the second utterance may include an identified intent. The identified intent for subsequent utterances (e.g., a second utterance, third utterance, fourth utterance etc.) may be based upon multiple utterances in a dialog session. The subsequent logical forms and/or intents may further be based upon responses generated by the dialog system in some cases. As a specific example, the following dialog session may be processed:
  Utterance 1: "I would like to order a cheeseburger."
  Logical Form 1: "Order_Food; Item=cheeseburger"
  Response 1: Any extra toppings?
  Utterance 2: "Add pickles"
  Logical form 2: "Add_Topping; Topping=pickles."
  Response 2: "OK. Anything else?"
The second intent of Add_Topping is predicated on the earlier first utterance, logical form, and response specifying that pickles are in the context of a topping for the cheeseburger. Accordingly, one or more input utterances and responses to a given point in a dialog session may be used to determine the logical form and intent at that point.

In some embodiments, the dialog system may refrain from performing one or more steps in the processing pipeline at a given point in the dialog. For example, a first utterance does not include sufficient information to determine an intent. In such a case, the dialog system may continue to process the following utterance(s), along with the first utterance, in a continuous stream until the overall intent is determined. As a specific example, the dialog system executes ASR and NLP on a first utterance, "I was wondering . . . [pause] . . . " and waits for a second utterance, "if you sell hats," before executing ASR and NLP on the second utterance, and processing both utterances together to determine an overall intent for the two utterances, Check_Stock.

In some embodiments, the processing in 308 is performed substantially in real time. "Substantially in real time," as used herein, refers to processing a stream of input data as the input data is received, rather than waiting for an indication that a complete utterance has been received. For example, the dialog system may process a sentence or set of words while the user continues to provide speech input and the dialog system continues to receive additional speech input. In some embodiments, the dialog system may process a partial utterance. For example, the system may split an utterance into chunks such as "I'd like to get," "a pizza" "without sauce," and process each chunk in turn.

In some embodiments, the speech input may be processed using an integrated speech recognition and natural language understanding pipeline. For example, a single neural network may be used to generate a logical form from speech input (e.g., without an intermediate step of outputting a text utterance). Techniques for integrated speech recognition and natural language understanding are described in, e.g., Lugosh et al., Speech Model Pre-training for End-to-End Spoken Language Understanding (https://arxiv.org/pdf/1904.03670.pdf) and Haghani et al., From Audio to Semantics: Approaches to end-to-end spoken language understanding (https://arxiv.org/abs/1809.09190).

At 310, the dialog system determines whether a response is to be generated. The dialog system may determine whether a response is to be generated based on one or more speech inputs received and processed. For example, if the user is likely to finish a sentence after a brief pause, then a response may not be appropriate at this point in the dialog. However, if clarification or feedback is appropriate after an utterance or combination of utterances, then a response may be appropriate. For example, if a user says, "I'd like to book a flight to . . . ", then the dialog system may determine that a response is not to be generated at this point, wait for another utterance, and receive a second utterance, "to Miami," at which point a response from the dialog system is appropriate.

At 312, if a response is to be generated at 310, then the dialog system may generate and output a response. The dialog system may execute a task and/or provide feedback to the user. The dialog system may generate the response based upon one or more speech inputs (e.g., a first speech input and/or a second speech input). The dialog system may provide, to the user, the response. Providing the response may be executed by preparing and outputting speech output. The dialog system may prepare a text response via the dialog manager subsystem 116 and NLG subsystem 118. Such a text response may be displayed to the user via a user interface. Alternatively, or additionally, a text response may be passed to the text-to speech subsystem 120, which converts the text response to a spoken response. The spoken response is then outputted as speech output 122 via speech output component 124. In some cases, the dialog system may determine and provide multiple responses within a dialog session (e.g., a response based on a first speech input, a response based on a second speech input, and so forth).

The dialog system may continuously process input and prepare responses. For example, the dialog system receives the speech input "I'd like to buy a plane ticket." The dialog system prepares and provides the response, "OK, where to?" while continuing to listen to additional speech input. The dialog system may further perform tasks such as looking up information, putting in an order, and/or the like, as the dialog session continues. In some embodiments, generating and outputting the response is performed prior to determining that a stopping condition is not met, as further described below with respect to 318.

At 314, the dialog system (e.g., state management subsystem 204) determines a current state of the dialog session. The dialog system may determine that the dialog session is in a particular state of a plurality of configured states. Various criteria related to the dialog session may be used to determine the current state of the dialog session. In some embodiments, the state of the dialog session may be based upon whether a pause has been detected and the length of one or more pauses detected in the dialog session (e.g., the temporal distance between utterances). Additional factors that may be used to determine the current state of the dialog session include the content of one or more received speech inputs, responses provided, identified intents, named entities, and/or logical forms, prior states within a session, and so forth. The dialog system may determine the current state based upon the speech input received at 304 (e.g., the last speech input received) or a combination of speech inputs received in the course of the dialog session (e.g., first speech input received at 304 and/or subsequent speech input received at 320). The dialog system may further base the state determination on a time elapsed in the dialog session (e.g., a total time elapsed and/or a time elapsed since the dialog session was last extended).

In some embodiments, the dialog system determines the current state based on a combination of such factors. The current state may be determined using rules and/or a machine learning model. For example, if the user pauses for 30 seconds and the previous speech input indicates that no further speech input is required, then the dialog system may determine that the dialog is in a state where it is likely that the user is done providing input, but further input is possible. On the other hand, if the user pauses for 30 seconds but has just said "hold on" or "and . . . " then the dialog system may determine that the user is most likely going to provide additional input. As another example, the dialog system may determine the current state based upon the intent determined at 308. For example, if the intent matches a system-supported function, and the user is potentially going to provide additional input, then the dialog system may determine that the dialog session is in the state Additional_Input_Likely.

In some embodiments, there may be a definitive mechanism for the user indicating that the user is done providing speech input (e.g., detecting that the user has pushed a "stop" button, or detecting an end word, such as "end" or "done," and so forth). If the user has indicated that they are done providing input, this may be used by the dialog system to assign a state indicating that no further input will be received. Techniques for determining a state of the dialog session are described in further detail below with respect to FIG. 4.

At 316, based on the current state determined in 314, the dialog system determines a time period value by which the dialog session is to be extended. The determined time period value sets a stopping condition for the dialog session. Thus, the time period value may establish how long a dialog session is to be continued, based on the current state of the dialog session. Accordingly, in some embodiments, as the state of the dialog session changes in the course of a dialog session, a new stopping condition is set dynamically.

The dialog system may determine the time period/stopping condition based upon the state determined at 314 and/or additional information including a length of the pause, the first speech input, and/or subsequent speech input (e.g. second speech input). The stopping condition can be calculated using rules or a machine learning model, either of which can take the state of the dialog session as input. In some embodiments, the state may directly map to a time period (e.g., if the dialog is in state "1," then the dialog session should be extended for at least one minute). Alternatively, or additionally, the time period may be based upon the current state in combination with additional information, which can establish an overall context of the dialog session used to determine the time period value. For example, if the dialog is in state "B" and the last voice input includes a named entity, then the dialog system determines that the dialog session is to be extended for thirty seconds. Alternatively, or additionally, step 314 may be omitted, and contextual factors can be used to determine the time period value by which the dialog session is to be extended without explicitly assigning a state to the dialog session.

In some embodiments, a time value of zero indicates that the dialog session not to be extended. Accordingly, the value of the "stopping condition" parameter may specify whether the session is to be extended or not. In some embodiments, the time period value and/or underlying state of the dialog session may vary depending on the user's speech patterns. For example, if a first user is taking longer pauses between utterances, in comparison to a second user taking shorter pauses, this may be factored into the computation of how long to extend the dialog session. In this way, in some embodiments, the time of extension is also user-customized.

At 318, the dialog system determines whether or not the stopping condition established at 316 has been met. In some embodiments, the dialog system uses the time period value determined at 316 to determine whether or not the stopping condition has been met. For example, if the time period is zero, then the stopping condition has been met. Alternatively, or additionally, the dialog system may determine whether or not the stopping condition has been met based on analyzing various contextual factors in the dialog session, as described above with respect to 314-316. In some embodiments, the dialog system may periodically determine whether or not the stopping condition has been met (e.g., every second, every tenth of a second, or every ten seconds, and so forth).

If the dialog system determines that the stopping condition for the dialog session is not met at 318, then the dialog system may extend the dialog session by at least the time period value indicated by the stopping condition. For example, if the stopping condition specifies to extend the dialog session by one minute, then the dialog system extends the dialog session by one minute.

If the stopping condition has not been met at 318, then the dialog system continues the dialog session. To continue the dialog session, the dialog system may continue to listen for additional input. The dialog system may continue to monitor for states and store data. The dialog system may continue to perform dialog processing (e.g., ASR, NLP, NLG, and/or TTS processing).

At 320, the dialog system receives additional speech input (e.g., second speech input, third speech input, fourth speech input, and so forth) while the dialog session is still active. The additional speech input may be received in a substantially similar fashion as described above with respect to step 304.

After receiving the additional speech input from the user at 320, the flow returns to 306. The dialog system may detect an additional pause (e.g., a second pause, third pause, and so forth) indicative of completion of an additional spoken utterance (e.g., a second spoken utterance, third spoken utterance, and so forth).

In subsequent iterations of 308, the dialog system processes the additional utterance(s) as described above. The speech input may be converted to a text utterance by the ASR subsystem 108 and passed to the NLU subsystem 110, which passes a logical form to the dialog manager subsystem 116. Processing the utterance(s) may include identify intent(s) and/or logical form(s) corresponding to the subsequent speech input (e.g., an intent corresponding to a second speech input, an intent corresponding to a third speech input, and so forth). As noted above with respect to 308, in some cases, the intent determined for a first speech input may inform the intent determined for a subsequent speech input (e.g., if the first speech input corresponds to a travel-related intent, then the model or rules may be configured to more heavily weight travel-related intents for subsequent speech input).

In some embodiments, the dialog system may process the additional speech input to determine whether the additional speech input is relevant to previous speech input (e.g., the first speech input), as described in further detail below with respect to FIG. 5. In some cases, the additional speech input may be relevant to the first speech input. For example, the first speech input is "One large supreme pizza." After a pause, the user provides second speech input, "No onions." In this case, the dialog system may update an overall logical form associated with the dialog session. For example, after the first speech input, the dialog system has identified the intent Order_Pizza and filled toppings slots with pepperoni, onions, bell peppers, and sausage. After processing the second speech input, the dialog system updates the logical form to remove onions from the toppings slots. In other cases, the dialog system may determine that the subsequent speech input is not relevant to the first speech input. For example, the additional speech input may correspond to the user speaking to another person or making irrelevant statements. In this case, the dialog system may disregard the additional speech input.

In some embodiments, the dialog system generates and outputs responses based on additional speech input. Such a response may be based on the last speech input received (e.g., a second response is determined based on processing of a second utterance). In some cases, subsequent responses may further be based on previous speech input (e.g., a second response may be based on second speech input as well as first speech input). For example, after processing a food order over the course of two utterances, the dialog system may prepare and provide a response such as, "Anything else?" or, "OK, that will be $21.99."

After determining an intent for additional speech input, and potentially performing actions, preparing a response, and/or providing a response, the flow may again proceed to 314 to determine a current state of the dialog session, and again to 316, including determining, by the dialog system based on the additional (e.g. second) spoken utterance, an additional (e.g., second, third, etc.) time value by which the dialog session is to be extended, corresponding to an additional (e.g., second, third, etc.) stopping condition. This may continue across multiple utterances, and potentially multiple responses, until a stopping condition is met at 318, at which point the dialog system may terminate the speech session at 322.

At 322, upon determining that the stopping condition has been met at 318, the dialog system terminates the dialog session. To terminate the dialog session, the dialog system may cease to listen for additional input. Alternatively, or additionally, the dialog system may cease to monitor for states and store data. In some embodiments, the dialog system may clear a temporary memory pertaining to the dialog.

Figure 4:
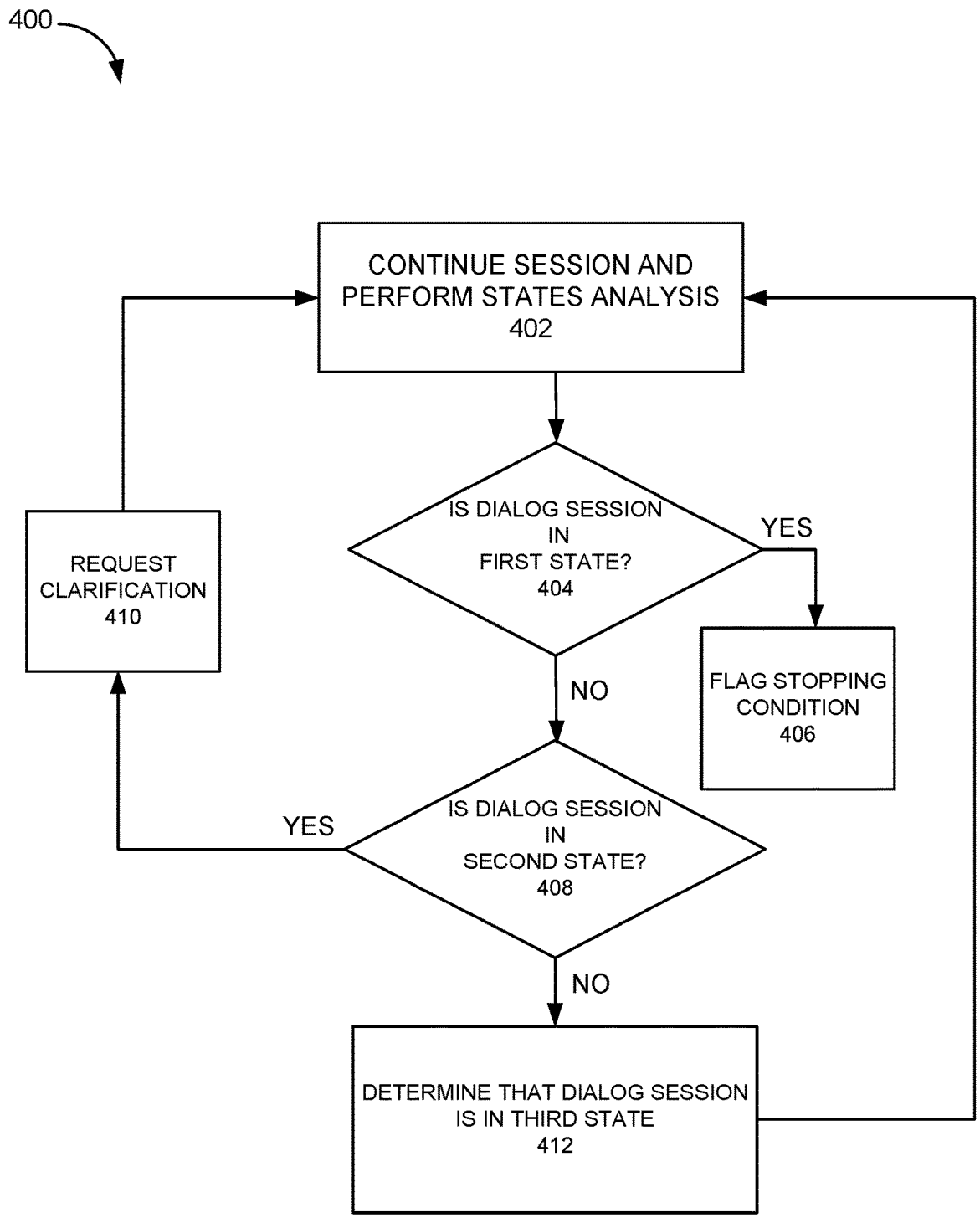
FIG. 4 depicts a simplified flowchart illustrating a method for determining whether the stopping condition of FIG. 3 has been met according to certain embodiments.

FIG. 4 depicts a simplified flowchart illustrating a method 400 for determining a state of the dialog session, as performed at 314 of FIG. 3, according to certain embodiments. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 4 may be performed by dialog manager subsystem 116 of FIGS. 1 and 2 and other components of the dialog system 100 described above with respect to FIG. 1. In certain embodiments, the processing depicted in FIG. 4 is performed in block 314 of FIG. 3 as part of determining the current state of the dialog session.

In some embodiments, the dialog system (e.g., the state management subsystem 204 of the dialog manager subsystem 116) performs states analysis to determine, at a given time, whether one of multiple states exist. For example, the dialog system may define three states: (1) the dialog system is confident that the user is done providing input (this may correspond to the stopping condition being met); (2) based upon previous speech input(s), the user is likely to provide additional speech input but has not spoken for a time—this may result in the dialog system outputting a prompt (e.g., "are you done?"); and (3) based upon previous speech input(s), the dialog system is confident the user will provide additional speech input.

At 402, the dialog system continues the dialog session and performs states analysis. Continuing the dialog session may include listening for, and/or processing, received speech input, as described above with respect to FIG. 3. Based on meaning derived from the received speech input, the dialog system may evaluate whether criteria for each state have been met.

At 404, the dialog system determines whether the dialog session is in a first state. In the first state, the user may be unlikely to provide additional feedback. For example, analysis of the overall dialog session may indicate that the dialog is complete. In some cases, an explicit indication that the user is unlikely to provide additional feedback may be received. For example, the user may explicitly push a stop button. As another example, the dialog system may determine that the dialog session is in the first state based on words processed. The presence of certain words or phrases may indicate that the dialog is complete (e.g., or the user may say "I am done," or that's it). In some cases, the dialog system may determine the dialog session is in the first state by detecting a pre-established stop word (e.g., "stop" or "done.").

In some embodiments, the dialog system may use a trained machine-learning model to use various contextual factors to predict whether the user is likely to provide additional input. As described above with respect to block 314 of FIG. 3, such contextual factors may include the length of one or more pauses, one or more utterances and derivatives thereof (e.g., intents, logical forms etc.), and the length of the dialog session itself.

In some embodiments, the dialog system may compute a value representing the likelihood of additional input being received. This value may be compared to a predefined threshold to determine whether the dialog session is in a particular state at a given time. For example, the dialog system may compute a confidence score which represents a confidence level that the user will provide additional speech input. The confidence score may be based on one or more factors such as the intent, key words in an utterance, and pause length. The confidence score may be compared to one or more threshold values, and, based on the comparison, the dialog system may determine that the dialog session is in a particular state. For example, the dialog system may determine that the dialog session is in the first state upon determining that the confidence score is below a threshold corresponding to the first state (e.g., 30%). As another example, the dialog system may use a set of rules to determine whether to remain in the first state (e.g., if a pause is above a threshold length). As described above, a length of a pause between speech inputs may be used to determine that the dialog session is in a particular state, alone or in combination with other factors. For example, a one-minute pause may generally indicate the user is done, but not if the user has just provided speech input indicating they are not done (e.g. "hang on" or "and . . . ").

If the dialog system determines that the dialog is in the first state, then the flow may proceed to 406. At 406, the dialog system may flag a stopping condition. This may be performed by determining that the dialog session is in the first state at 314, which is then used at 316 to determine that the corresponding time period value is zero.

If the dialog system determines that the dialog session is not in the first state at 404, then the flow may proceed to 408. At 408, the dialog system determines whether the dialog is in a second state. The second state may correspond to an intermediate level of confidence that the user will continue to provide input. For example, a computed confidence score, and/or individual values such as pause length, as described above with respect to 404, may be between a first threshold and a second threshold. As a specific example, if the last pause detected is between 30 seconds and 2 minutes, then the second state may be triggered. As another example, if the confidence score is between 40% and 80%, then the second state may be triggered. When in the second state, the dialog system may proceed to 410 to request clarification.

At 410, the dialog system requests clarification from the user. The dialog system may request clarification by providing speech or text output such as "Anything else?" or "Are you done?". Alternatively, or additionally, the dialog system may request clarification by displaying visualizations such as a check mark that a user may interact with to indicate that they are done providing input.

Subsequent to requesting clarification at 410, the dialog system may or may not receive input responsive to the request at 410. The dialog system returns to 402 and uses the input, or absence thereof, to perform additional states analysis. For example, the user may respond to "Anything else?" with "No," indicating that the user is done providing input. As another example, the user may respond to "Are you done?" with "No," indicating that the user is not done providing input. Such input, or absence thereof, is factored in to the states processing at 402-406.

If the dialog system determines that the dialog session is not in the second state at 406, then the flow may proceed to 412. At 412, the dialog system determines that the dialog session is in a third state. The third state is a state in which additional speech input is likely (e.g., it is appropriate to continue the dialog session and wait for additional speech input). As described above with respect to FIG. 3, the dialog system may determine that it is appropriate to continue a dialog session based upon factors such as the content of previous speech input, the length of one or more pauses, and the number of utterances received within the dialog session. The dialog system may determine that the dialog session is in the third state based on a confidence score, as described above with respect to 404 and 408. For example, if the confidence score exceeds a threshold of 80%, then the dialog system determines that the dialog session is in the third state. As another example, if a pause and/or the length of the dialog session is below a threshold, the dialog system may determine that the dialog session is in the third state. For example, after a pause of 10 seconds, the dialog system may determine that additional speech input is likely.

If the dialog system determines that the dialog is in the first state, then the flow may proceed to 402, and the dialog system may continue performing states analysis until a stopping condition is met.

Figure 5:
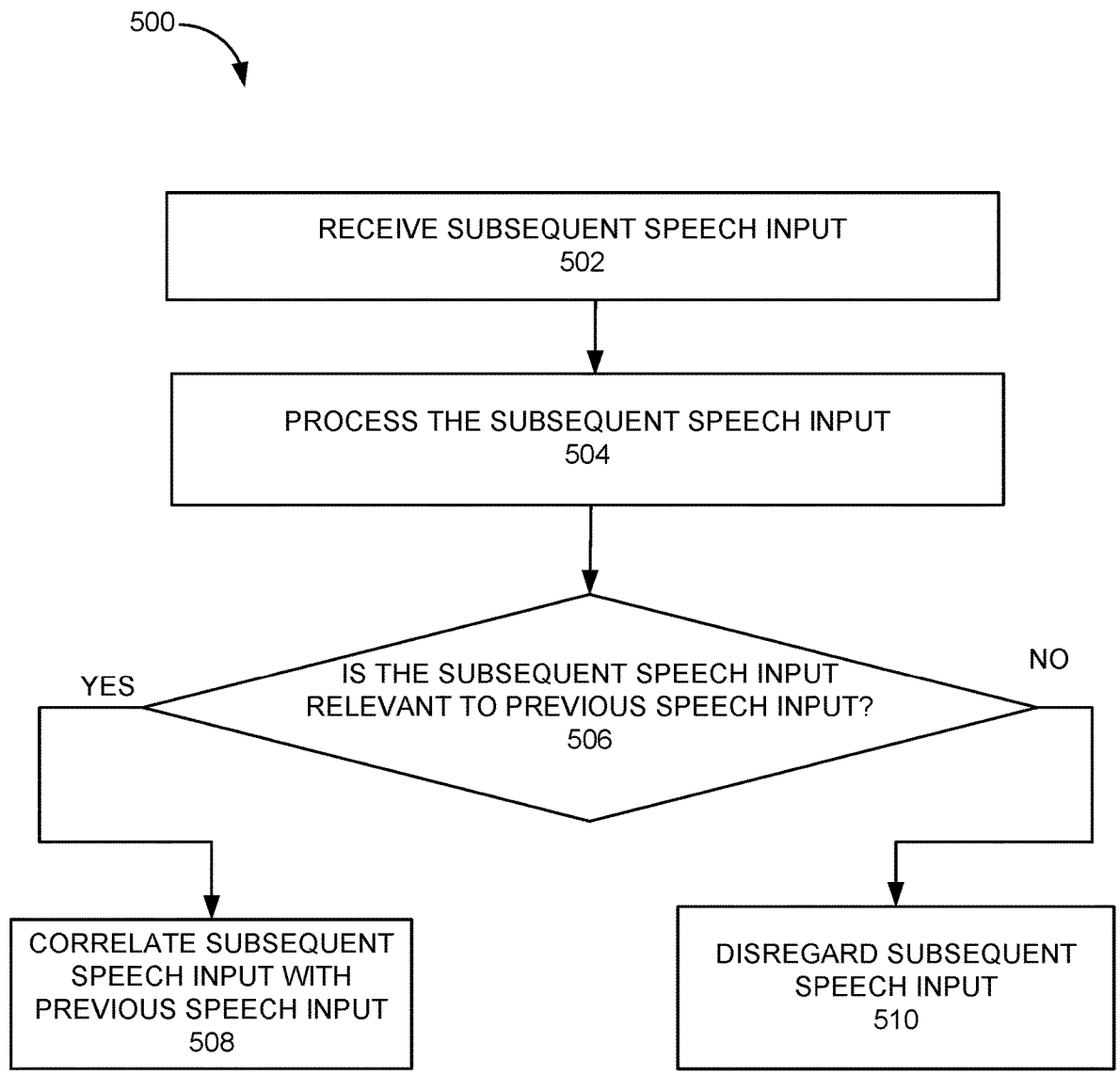
FIG. 5 depicts a simplified flowchart illustrating a method for determining whether speech input is relevant to other speech input according to certain embodiments.

FIG. 5 depicts a simplified flowchart illustrating a method 500 for determining whether speech input is relevant to other speech input according to certain embodiments. The processing depicted in FIG. 5 may be performed after receiving one or more speech inputs (e.g., a first speech input, and potentially a second speech input, third speech input, and so forth). In certain embodiments, the processing depicted in FIG. 5 may be performed by dialog manager subsystem 116 of FIGS. 1 and 2 and other components of the dialog system 100 described above with respect to FIG. 1. In certain embodiments, the processing depicted in FIG. 5 is performed in block 308 of FIG. 3 as part of processing an utterance. The processing depicted in FIG. 5 may further be used in determining the current state of the dialog session at 314.

At 502, the dialog system receives subsequent speech input from the user. The subsequent speech input may be received as described above with respect to block 322 of FIG. 3.

At 504, the dialog system processes the subsequent speech input (e.g., the second speech input, the third speech input, etc.). The dialog system (e.g., the NLU subsystem 110) may process the speech input as described above with respect to 308 of FIG. 3.

At 506, the dialog system determines whether the subsequent speech input is relevant to previous speech input. The dialog system may identify whether words related to an intent of the previous speech input are present in the subsequent speech input. The dialog system may use rules or a trained machine learning model to determine whether the subsequent speech input is relevant to the previous speech input. For example, the dialog system may compute a similarity score between the previous speech input and the subsequent speech input. If the similarity score is above a threshold, then the dialog system may determine that the subsequent speech input is relevant to the previous speech input. If the similarity score is not above the threshold, then the dialog system may determine that the subsequent speech input is not relevant to the previous speech input. In some embodiments, such rules and/or models may be configured to identify words associated with an aside (e.g., "umm," names of people, and other utterances that indicate that the speech input should not be processed as part of the dialog).

At 508, if the dialog system determines that the subsequent speech input is relevant to the previous speech input, then the dialog system processes the subsequent speech input with the previous speech input. Correlating the speech input may include determining how different utterances relate to one another (e.g., add drink to pizza order). Alternatively, or additionally, correlating the speech input the subsequent speech input with the previous speech input may include updating a meaning representation generated based upon previous speech input (e.g., by filling additional slots, correcting a misunderstanding, or the like).

At 510, if the dialog system determines that the subsequent speech input is not relevant to the previous speech input, then the dialog system disregards the subsequent speech input. The dialog system may refrain from using the subsequent speech input that is deemed not relevant (e.g., the subsequent speech input is not used to generate responses or perform actions). The dialog system may discard any subsequent speech input that is not relevant. Accordingly, the process of continuing the speech session described in FIG. 3 can further include ignoring irrelevant speech input and continuing the session.

The techniques described herein provide multiple advantages. By monitoring for speech input continuously in an open-ended fashion, drawbacks of prior systems can be eliminated or reduced. As described above, prior systems typically limit dialogs to one request and one response from the system, which can create a disjointed user experience. Using the techniques of the present disclosure, the system can determine whether it should maintain a session and continue a dialog, or terminate the dialog. Thus, the experience is more streamlined, enabling pauses or breaks in a request. This can reduce the overall time and processing required to perform a user requested function, as there would not be a need to start the dialog over, initiate a new session, and so forth, every time the user pauses in the dialog.

The infrastructure described above can be implemented in various different environments including a cloud environment (could be various types of clouds including private, public, and hybrid cloud environments), on-premises environment, a hybrid environment, and the like.

Figure 6:
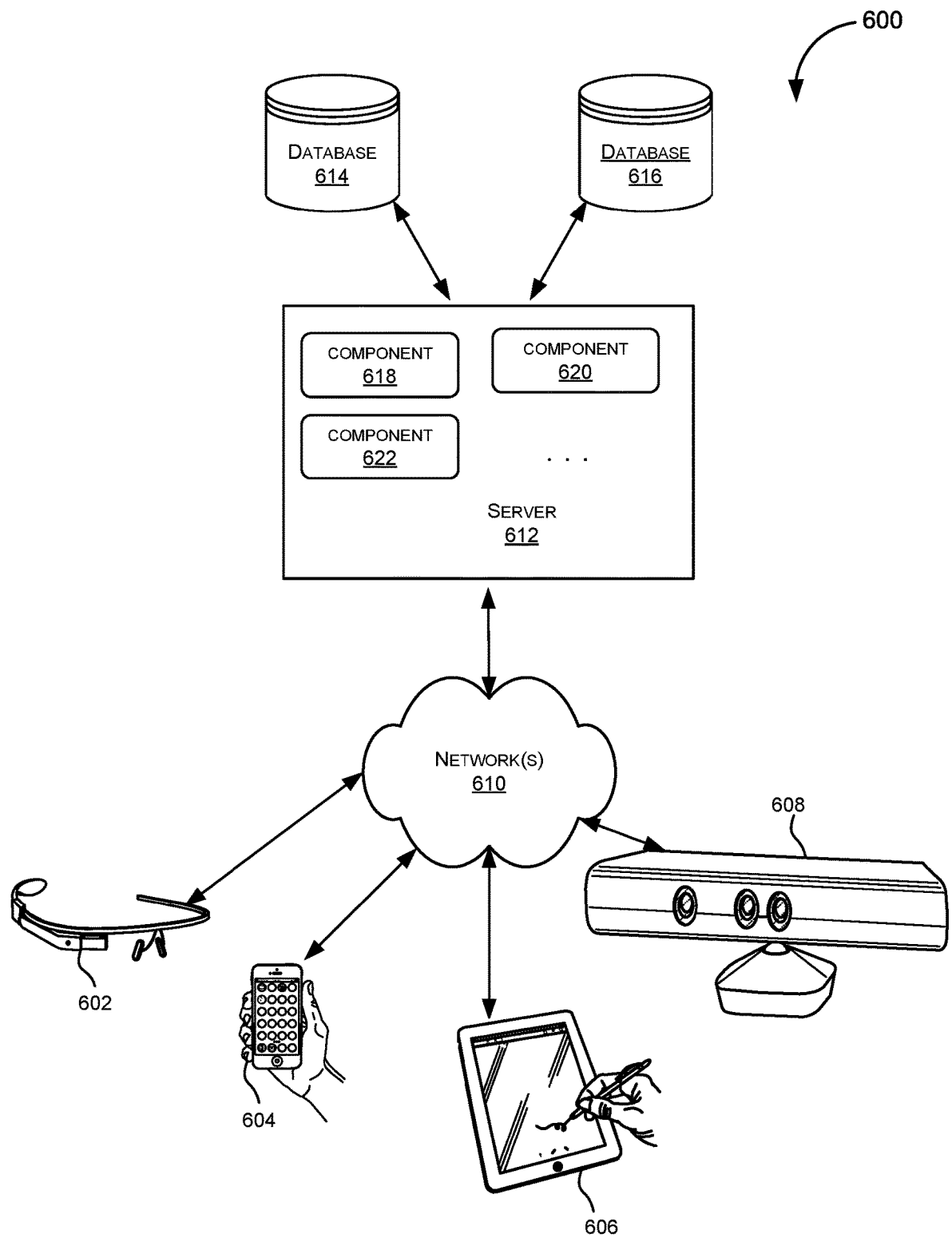
FIG. 6 depicts a simplified diagram of a distributed system for implementing an embodiment.

FIG. 6 depicts a simplified diagram of a distributed system 600 for implementing an embodiment. In the illustrated embodiment, distributed system 600 includes one or more client computing devices 602, 604, 606, and 608, coupled to a server 612 via one or more communication networks 610. Clients computing devices 602, 604, 606, and 608 may be configured to execute one or more applications.

In various embodiments, server 612 may be adapted to run one or more services or software applications that enable for continuous intent determination across one or more utterances.

In certain embodiments, server 612 may also provide other services or software applications that can include non-virtual and virtual environments. In some embodiments, these services may be offered as web-based or cloud services, such as under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in FIG. 6, server 612 may include one or more components 618, 620 and 262 that implement the functions performed by server 612. These components may include software components that may be executed by one or more processors, hardware components, or combinations thereof. It should be appreciated that various different system configurations are possible, which may be different from distributed system 600. The embodiment shown in FIG. 6 is thus one example of a distributed system for implementing an embodiment system and is not intended to be limiting.

Users may use client computing devices 602, 604, 606, and/or 608 to dynamically extend a dialog session across one or more utterances in accordance with the teachings of this disclosure. A client device may provide an interface that enables a user of the client device to interact with the client device. The client device may also output information to the user via this interface. Although FIG. 6 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 610 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 610 can be a local area network (LAN), networks based upon Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization such as one or more flexible pools of logical storage devices that can be virtualized to maintain virtual storage devices for the server. In various embodiments, server 612 may be adapted to run one or more services or software applications that provide the functionality described in the foregoing disclosure.

The computing systems in server 612 may run one or more operating systems including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more data repositories 614, 616. These data repositories may be used to store data and other information in certain embodiments. For example, one or more of the data repositories 614, 616 may be used to store information such as dialog history. Data repositories 614, 616 may reside in a variety of locations. For example, a data repository used by server 612 may be local to server 612 or may be remote from server 612 and in communication with server 612 via a network-based or dedicated connection. Data repositories 614, 616 may be of different types. In certain embodiments, a data repository used by server 612 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 614, 616 may also be used by applications to store application data. The data repositories used by applications may be of different types such as, for example, a key-value store repository, an object store repository, or a general storage repository supported by a file system.

Figure 7:
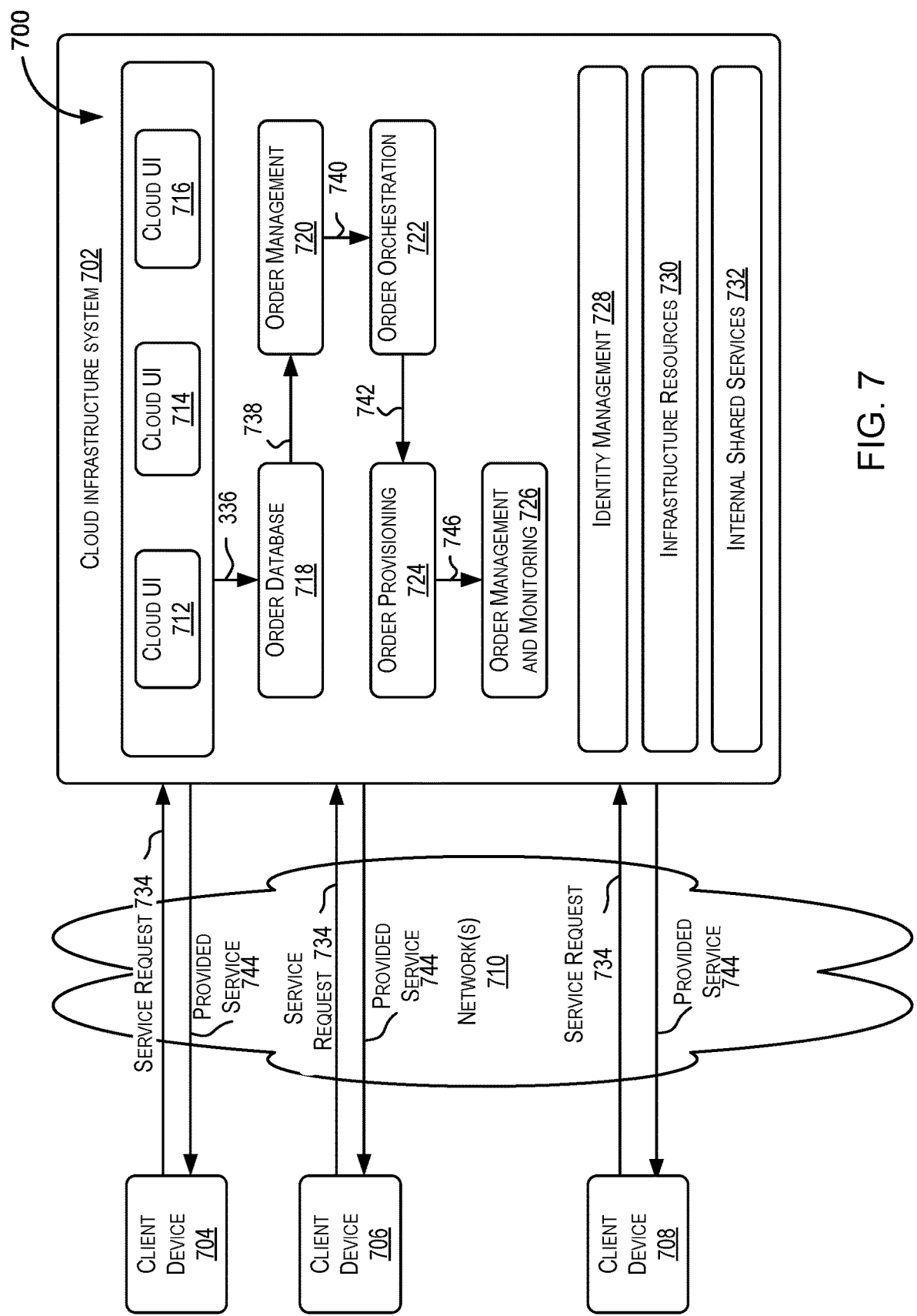
FIG. 7 illustrates a simplified block diagram of a cloud-based system environment in which various dialog-session-related services may be offered as cloud services, in accordance with certain embodiments.

In certain embodiments, the dialog session extension functionalities described in this disclosure may be offered as services via a cloud environment. FIG. 7 is a simplified block diagram of a cloud-based system environment in which various dialog-session-related services may be offered as cloud services, in accordance with certain embodiments. In the embodiment depicted in FIG. 7, cloud infrastructure system 702 may provide one or more cloud services that may be requested by users using one or more client computing devices 704, 706, and 708. Cloud infrastructure system 702 may comprise one or more computers and/or servers. The computers in cloud infrastructure system 702 may be organized as general purpose computers, specialized server computers, server farms, server clusters, or any other appropriate arrangement and/or combination.

Network(s) 710 may facilitate communication and exchange of data between clients 704, 706, and 708 and cloud infrastructure system 702. Network(s) 710 may include one or more networks. The networks may be of the same or different types. Network(s) 710 may support one or more communication protocols, including wired and/or wireless protocols, for facilitating the communications.

The embodiment depicted in FIG. 7 is only one example of a cloud infrastructure system and is not intended to be limiting. It should be appreciated that, in some other embodiments, cloud infrastructure system 702 may have more or fewer components than those depicted in FIG. 7, may combine two or more components, or may have a different configuration or arrangement of components. For example, although FIG. 7 depicts three client computing devices, any number of client computing devices may be supported in alternative embodiments.

The term cloud service is generally used to refer to a service that is made available to users on demand and via a communication network such as the Internet by systems (e.g., cloud infrastructure system 702) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 702 may provide one or more cloud services using different models such as under a Software as a Service (SaaS) model, a Platform as a Service (PaaS) model, an Infrastructure as a Service (IaaS) model, and others, including hybrid service models. Cloud infrastructure system 702 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 702. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 702. Cloud infrastructure system 702 then performs processing to provide the services requested in the customer's subscription order. For example, cloud infrastructure system 702 uses historical context to influence dialog tasks. Cloud infrastructure system 702 may be configured to provide one or even multiple cloud services.

Cloud infrastructure system 702 may provide the cloud services via different deployment models. In a public cloud model, cloud infrastructure system 702 may be owned by a third party cloud services provider and the cloud services are offered to any general public customer, where the customer can be an individual or an enterprise. In certain other embodiments, under a private cloud model, cloud infrastructure system 702 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 702 and the services provided may be shared by several organizations in a related community. Various other models such as hybrids of the above mentioned models may also be used.

Client computing devices 704, 706, and 708 may be of different types (such as devices 602, 604, 606, and 608 depicted in FIG. 6) and may be capable of operating one or more client applications. A user may use a client device to interact with cloud infrastructure system 702, such as to request a service provided by cloud infrastructure system 702. For example, a user may use a client device to request a dialog-session-related service described in this disclosure.

In some embodiments, the processing performed by cloud infrastructure system 702 for providing dialog-session-related services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 702 for identifying an intent based upon received speech input. The data used for this analysis may include structured data (e.g., data stored in a database or structured according to a structured model) and/or unstructured data (e.g., data blobs (binary large objects)).

As depicted in the embodiment in FIG. 7, cloud infrastructure system 702 may include infrastructure resources 730 that are utilized for facilitating the provision of various cloud services offered by cloud infrastructure system 702. Infrastructure resources 730 may include, for example, processing resources, storage or memory resources, networking resources, and the like.

In certain embodiments, to facilitate efficient provisioning of these resources for supporting the various cloud services provided by cloud infrastructure system 702 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services that may include those described above for server 212. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 702 may itself internally use services 732 that are shared by different components of cloud infrastructure system 702 and which facilitate the provisioning of services by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 702 may comprise multiple subsystems. These subsystems may be implemented in software, or hardware, or combinations thereof. As depicted in FIG. 7, the subsystems may include a user interface subsystem 712 that enables users or customers of cloud infrastructure system 702 to interact with cloud infrastructure system 702. User interface subsystem 712 may include various different interfaces such as a web interface 714, an online store interface 716 where cloud services provided by cloud infrastructure system 702 are advertised and are purchasable by a consumer, and other interfaces 718. For example, a customer may, using a client device, request (service request 734) one or more services provided by cloud infrastructure system 702 using one or more of interfaces 714, 716, and 718. For example, a customer may access the online store, browse cloud services offered by cloud infrastructure system 702, and place a subscription order for one or more services offered by cloud infrastructure system 702 that the customer wishes to subscribe to. The service request may include information identifying the customer and one or more services that the customer desires to subscribe to. For example, a customer may place a subscription order for a dialog-session-related service offered by cloud infrastructure system 702. As part of the order, the customer may provide speech input identifying a request.

In certain embodiments, such as the embodiment depicted in FIG. 7, cloud infrastructure system 702 may comprise an order management subsystem (OMS) 720 that is configured to process the new order. As part of this processing, OMS 720 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 720 may then invoke the order provisioning subsystem (OPS) 724 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 724 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 702 may send a response or notification 744 to the requesting customer to indicate when the requested service is now ready for use. In some instances, information (e.g., a link) may be sent to the customer that enables the customer to start using and availing the benefits of the requested services. In certain embodiments, for a customer requesting the dialog-session-related service, the response may include a response generated based upon an identified intent.

Cloud infrastructure system 702 may provide services to multiple customers. For each customer, cloud infrastructure system 702 is responsible for managing information related to one or more subscription orders received from the customer, maintaining customer data related to the orders, and providing the requested services to the customer. Cloud infrastructure system 702 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 702 may provide services to multiple customers in parallel. Cloud infrastructure system 702 may store information for these customers, including possibly proprietary information. In certain embodiments, cloud infrastructure system 702 comprises an identity management subsystem (IMS) 728 that is configured to manage customers information and provide the separation of the managed information such that information related to one customer is not accessible by another customer. IMS 728 may be configured to provide various security-related services such as identity services, such as information access management, authentication and authorization services, services for managing customer identities and roles and related capabilities, and the like.

Figure 8:
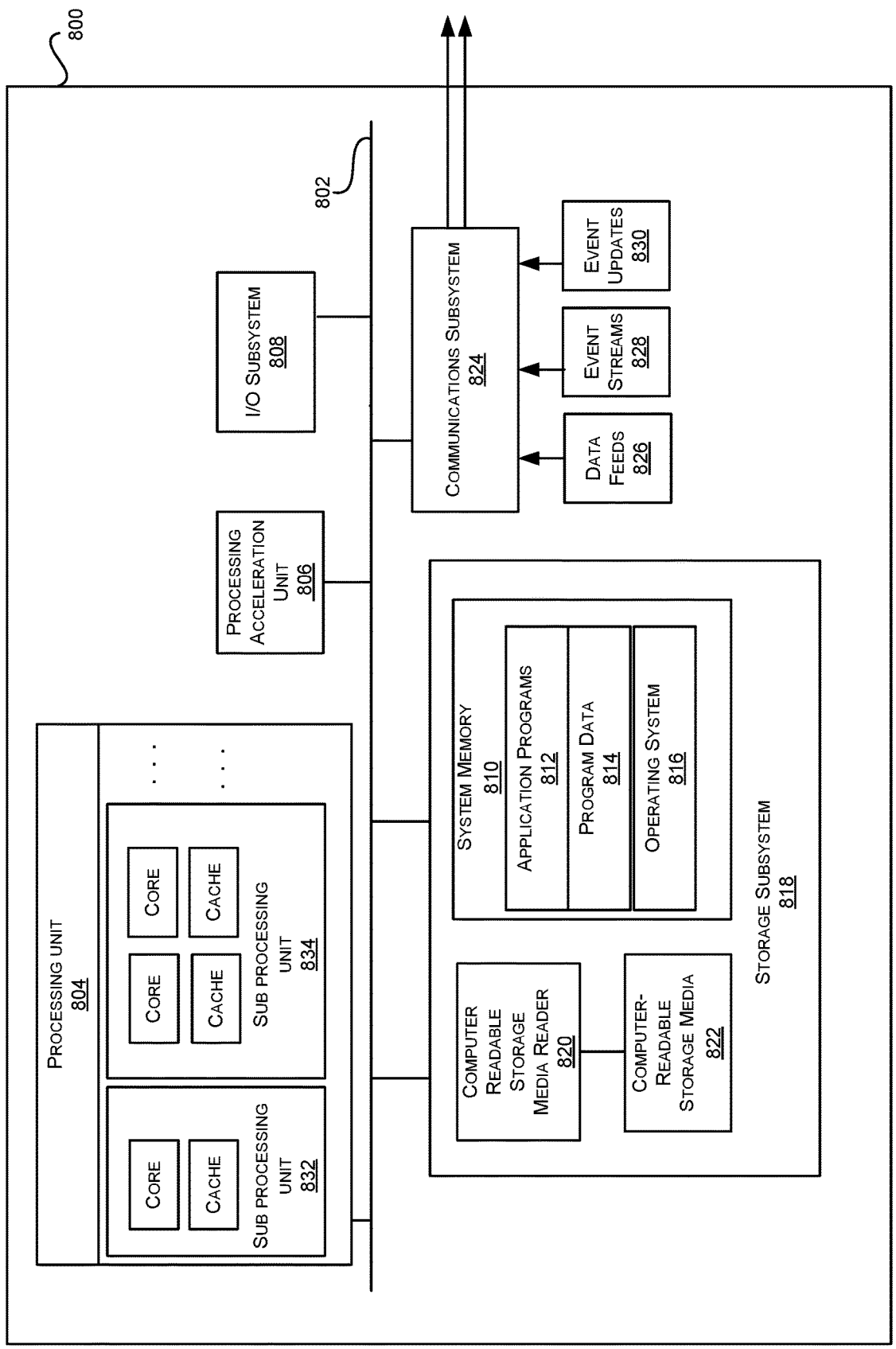
FIG. 8 illustrates an exemplary computer system that may be used to implement certain embodiments.

FIG. 8 illustrates an exemplary computer system 800 that may be used to implement certain embodiments. For example, in some embodiments, computer system 800 may be used to implement any of the ASR subsystem, NLU subsystem, and various servers and computer systems described above. As shown in FIG. 8, computer system 800 includes various subsystems including a processing subsystem 804 that communicates with a number of other subsystems via a bus subsystem 802. These other subsystems may include a processing acceleration unit 806, an I/O subsystem 808, a storage subsystem 818, and a communications subsystem 824. Storage subsystem 818 may include non-transitory computer-readable storage media including storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processors, application specific integrated circuits (ASICs), or field programmable gate arrays (FPGAs). The processors may include be single core or multicore processors. The processing resources of computer system 800 can be organized into one or more processing units 832, 834, etc. A processing unit may include one or more processors, one or more cores from the same or different processors, a combination of cores and processors, or other combinations of cores and processors. In some embodiments, processing subsystem 804 can include one or more special purpose co-processors such as graphics processors, digital signal processors (DSPs), or the like. In some embodiments, some or all of the processing units of processing subsystem 804 can be implemented using customized circuits, such as application specific integrated circuits (ASICs), or field programmable gate arrays (FPGAs).

In some embodiments, the processing units in processing subsystem 804 can execute instructions stored in system memory 810 or on computer readable storage media 822. In various embodiments, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities described above. In instances where computer system 800 is executing one or more virtual machines, one or more processing units may be allocated to each virtual machine.

In certain embodiments, a processing acceleration unit 806 may optionally be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google) Glass®). Additionally, user interface input devices may include voice recognition sensing devices that enable users to interact with voice recognition systems through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information and data that is used by computer system 800. Storage subsystem 818 provides a tangible non-transitory computer-readable storage medium for storing the basic programming and data constructs that provide the functionality of some embodiments. Storage subsystem 818 may store software (e.g., programs, code modules, instructions) that when executed by processing subsystem 804 provides the functionality described above. The software may be executed by one or more processing units of processing subsystem 804. Storage subsystem 818 may also provide a repository for storing data used in accordance with the teachings of this disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM), dynamic random access memory (DRAM), and the like.

By way of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 822 may store programming and data constructs that provide the functionality of some embodiments. Computer-readable media 822 may provide storage of computer-readable instructions, data structures, program modules, and other data for computer system 800. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based upon non-volatile memory such as flash-memory based SSDs, enterprise flash drives, solid state ROM, and the like, SSDs based upon volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 818 may also include a computer-readable storage media reader 820 that can further be connected to computer-readable storage media 822. Reader 820 may receive and be configured to read data from a memory device such as a disk, a flash drive, etc.

In certain embodiments, computer system 800 may support virtualization technologies, including but not limited to virtualization of processing and memory resources. For example, computer system 800 may provide support for executing one or more virtual machines. In certain embodiments, computer system 800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices. For example, the communication subsystem may be used to communicate with a database to execute a query to identify requestable entities.

Communication subsystem 824 may support both wired and/or wireless communication protocols. For example, in certain embodiments, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

Communication subsystem 824 can receive and transmit data in various forms. For example, in some embodiments, in addition to other forms, communications subsystem 824 may receive input communications in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible. Based upon the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A computer-implemented method for managing a dialog, the method comprising:
    initiating, by a dialog system, a dialog session;
    receiving, by the dialog system, a first speech input;
    detecting, by the dialog system, a pause in the first speech input indicative of completion of a first spoken utterance;
    determining, by the dialog system based on the first spoken utterance, a stopping condition for the dialog session, wherein the stopping condition indicates a first time value by which the dialog session is to be extended;
    generating, by the dialog system, a response based on the first speech input;
    outputting, by the dialog system, the response;
    determining, by the dialog system, that the stopping condition for the dialog session is not met,
    wherein generating and outputting the response is performed prior to determining that the stopping condition is not met;
    responsive to determining that the stopping condition is not met, extending the dialog session by at least the first time value indicated by the stopping condition;
    receiving, by the dialog system, a second speech input;
    based upon the second speech input and the first speech input, determining, by the dialog system, that the second speech input is not relevant to the first speech input; and
    disregarding, by the dialog system, the second speech input.

2. The method of claim 1, further comprising:
    determining, by the dialog system, that the dialog session is in a particular state, of a plurality of configured states,
    wherein the dialog system determines the stopping condition for the dialog session based on the determined state.

3. The method of claim 1, further comprising:
    receiving, by the dialog system, a third speech input;
    detecting, by the dialog system, a second pause in the third speech input indicative of completion of a second spoken utterance; and
    determining, by the dialog system based on the second spoken utterance, a second stopping condition for the dialog session, wherein the second stopping condition indicates a second time value by which the dialog session is to be extended.

4. The method of claim 3, further comprising:
    identifying, by the dialog system, an intent based on the first speech input and third speech input.

5. The method of claim 3, further comprising:
    generating, by the dialog system, a second response based on one or more of the first speech input or the third speech input; and
    outputting, by the dialog system, the second response.

6. The method of claim 5, further comprising:
    subsequent to outputting the response, determining, by the dialog system, that the second stopping condition is met; and
    terminating, by the dialog system, the dialog session.

7. The method of claim 3, wherein:
    the dialog system determines the second stopping condition based upon one or more of: a length of the pause, the first speech input, or the third speech input.

8. The method of claim 1, wherein initiating the dialog session comprises one or more of:
    detecting a wake word; or
    detecting interaction with a start button.

9. A non-transitory computer-readable memory storing a plurality of instructions executable by one or more processors for managing a dialog, the plurality of instructions comprising instructions that when executed by the one or more processors cause the one or more processors to perform processing comprising:
    initiating a dialog session;
    receiving a first speech input;
    detecting a pause in the first speech input indicative of completion of a first spoken utterance;
    determining, based on the first spoken utterance, a stopping condition for the dialog session,
    wherein the stopping condition indicates a first time value by which the dialog session is to be extended;
    generating a response based on the first speech input;
    outputting the response;
    determining that the stopping condition for the dialog session is not met, wherein generating and outputting the response is performed prior to determining that the stopping condition is not met; and
    responsive to determining that the stopping condition is not met, extending the dialog session by at least the first time value indicated by the stopping condition;
    receiving a second speech input;
    based upon the second speech input and the first speech input, determining that the second speech input is not relevant to the first speech input; and
    disregarding the second speech input.

10. The non-transitory computer-readable memory of claim 9, the processing further comprising: determining that the dialog session is in a particular state, of a plurality of configured states, wherein the stopping condition for the dialog session is determined based on the determined state.

11. The non-transitory computer-readable memory of claim 9, the processing further comprising:
    receiving a third speech input;
    detecting a second pause in the third speech input indicative of completion of a second spoken utterance; and
    determining, based on the second spoken utterance, second stopping condition for the dialog session, wherein the second stopping condition indicates a second time value by which the dialog session is to be extended.

12. The non-transitory computer-readable memory of claim 11, the processing further comprising:
    identifying an intent based on the first speech input and the third speech input.

13. A system comprising:
    one or more processors;
    a memory coupled to the one or more processors, the memory storing a plurality of instructions executable by the one or more processors for managing a dialog, the plurality of instructions comprising instructions that when executed by the one or more processors cause the one or more processors to perform processing comprising:
    initiating a dialog session;
    receiving a first speech input;
    detecting a pause in the first speech input indicative of completion of a first spoken utterance;

determining, based on the first spoken utterance, a stopping condition for the dialog session,
wherein the stopping condition indicates a first time value by which the dialog session is to be extended;
generating a response based on the first speech input;
outputting the response;
determining that the stopping condition for the dialog session is not met, wherein generating and outputting the response is performed prior to determining that the stopping condition is not met; and
responsive to determining that the stopping condition is not met, extending the dialog session by at least the first time value indicated by the stopping condition;
receiving a second speech input;
based upon the second speech input and the first speech input, determining that the second speech input is not relevant to the first speech input; and
disregarding the second speech input.

14. The system of claim 13, the processing further comprising:
determining that the dialog session is in a particular state, of a plurality of configured states,
wherein the determination that the stopping condition is not met is based upon the determined state.

15. The system of claim 13, the processing further comprising:
receiving a third speech input;
detecting a second pause in the third speech input indicative of completion of a second spoken utterance;
determining, based on the second spoken utterance, a second stopping condition for the dialog session, wherein the second stopping condition indicates a second time value by which the dialog session is to be extended; and
identifying an intent based on the first speech input and the third speech input.

* * * * *

UNITED STATES PATENT AND TRADEMARK OFFICE
CERTIFICATE OF CORRECTION

PATENT NO. : 11,551,665 B2
APPLICATION NO. : 16/923483
DATED : January 10, 2023
INVENTOR(S) : Kennewick et al.

It is certified that error appears in the above-identified patent and that said Letters Patent is hereby corrected as shown below:

In the Specification

In Column 20, Line 54, delete "infra-red" and insert -- infrared --, therefor.

In Column 27, Line 15, delete "Google) Glass®)." and insert -- Google Glass®). --, therefor.

In the Claims

In Column 31, Line 57, in Claim 4, delete "and third" and insert -- and the third --, therefor.

Signed and Sealed this
Tenth Day of October, 2023

*Katherine Kelly Vidal*
Katherine Kelly Vidal
*Director of the United States Patent and Trademark Office*